Patented Aug. 27, 1946

2,406,654

UNITED STATES PATENT OFFICE 2,406,654

ACYLACETO GUANAZOLS

Abraham Bavley, Binghamton, N. Y., assignor to General Aniline & Film Corporation, New York, N. Y., a corporation of Delaware No Drawing. Application June 12, 1943,
Serial No. 490,632

5 Claims. (Cl. 260—308)

This invention relates to new guanazol derivatives which are color formers for the production of yellow color photographic images.

The compounds of the present invention are guanazols (3.5-diamino-1.2.4-triazoles) in which at least one and preferably both of the amino groups on the triazole ring are mono-substituted by an acylaceto group. The compounds have the following general formula:

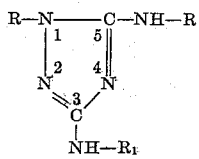

wherein R represents an aralkyl or aryl radical, e. g. benzyl, phenyl, naphthyl, anthranyl, diphenyl, and the like, which further may be substituted by such groups as halogen atoms, e. g. chlorine, bromine, etc., nitro, amino, sulfo, hydroxyl, carboxyl, alkoxy, e. g., methoxy, ethoxy, propoxy, dodecoxy, heptodecoxy, etc., aryloxy, e. g. phenoxy, naphthoxy, etc., hydrocarbon and hydroxy hydrocarbon groups, such as methyl, ethyl, propyl, butyl, octyl, decyl, dodecyl, stearyl, cyclohexyl, benzyl, phenyl, hydroxy methylene, hydroxy ethylene, hydroxy propylene, hydroxy phenyl, hydroxy naphthyl and the like, and $R_1$ represents hydrogen or the acylaceto group

—COCH$_2$COR$_2$ wherein $R_2$ represents an organic radical which is free from color-forming phenolic hydroxyl groups, one $R_1$ always being the aforesaid acylaceto group.

$R_2$ may be an alkyl, cycloalkyl, aralkyl, aryl or heterocyclic group, e. g., methyl, ethyl, propyl, decyl, stearyl, cyclohexyl, naphthenyl, abietyl, benzyl, naphthyl, anthranyl, diphenyl, pyridyl, quinolyl, thiazolyl, furyl, etc., which groups further may be substituted as in the case of the groups R with the exception that in the case of hydroxyl substituents they should not with the aryl group constitute color-forming phenolic hydroxyl groups.

It is known in the art that the development of an exposed silver halide emulsion with a primary aromatic amine in the presence of a compound containing an acylaceto group leads to the formation of yellow dyestuff images. Similarly, the art is cognizant of the fact that the development of an exposed silver halide emulsion with a primary aromatic amine in the presence of a phenol, the hydroxyl group or groups of which are para to a reactive coupling center, i. e., a free position or one occupied by a group which splits off in the coupling reaction, produces cyan images. If, therefore, there were present in the color formers of the present invention, such phenolic groups in addition to the acylaceto groups, dyestuff images would result upon color-forming development which would not possess the intended color. Consequently, in order for the color formers of the present invention to function in color photography in the manner intended, it is essential that they be free from color-forming phenolic hydroxyl groups.

Where both of the guanazol amino groups contain an acylaceto group $R_1$ in accordance with the preferred embodiment of the invention, this group may be the same or different. In either event, the compounds contain two active methylene groups which enhance the stability of the color obtained on coupling of the compounds with an aromatic amino developer, e. g., p-diethyl amino aniline, in the presence of an exposed silver halide emulsion.

While, in general, the compounds are water-insoluble, their solubility may be increased by the introduction of suitable water-solubilizing groups, e. g., sulfo or carboxyl groups, into either or both of the groups represented by R and $R_2$.

Among the compounds embraced by the invention are, for example, the mono- and bis-acetylaceto-1-benzyl, -1-phenyl, -1-naphthyl and -1-diphenyl guanazols, mono benzoylaceto -1-benzyl guanazol, 3.5-bis (benzoylaceto) 1-phenyl guanazol, 3.5-bis (furoylaceto) 1-phenyl guanazol, 3.5-bis (nicotinoylaceto) 1-phenyl guanazol, 3.5-bis (quinoylaceto) 1-phenyl guanazol, 3.5-bis (stearoylaceto) 1-benzyl guanazol, 3.5-bis (a-naphthoylaceto) 1-naphthyl guanazol, 3.5-bis (b-naphthoylaceto) 1-phenyl guanazol, 3.5-bis (p-stearoylamino benzoylaceto) 1-phenyl guanazol, 3-acetylaceto -5-benzoylaceto -1-phenyl guanazol and 3-acetylaceto-5-furoylaceto -1-benzyl guanazol.

Color formers for subtractive three-color photography may be located in the developer itself or in layers of the multilayer three-color film. In the event that they are located in the film, it is necessary that the constitution thereof be such that they will not migrate from one layer to the other, else color distortion would result upon color-forming development. It has been proposed to prevent migration of color formers from silver halide emulsion layers by rendering such color formers "fast to diffusion in gelatin." This result may be accomplished in several ways, for instance by including in the color formers proper, a group which in the sense of the dyestuff art is substantive or by so enlarging the molecule of the color formers that it is incapable of diffusing from gelatin. Examples of color formers which are rendered fast to diffusion by the first method are disclosed in U. S. P. 2,179,228. Examples of color formers which are rendered fast to diffusion by the second method are disclosed in U. S. Patents 2,178,612, 2,179,244, 2,186,719, 2,186,732, 2,186,849 and 2,186,734. It will be seen from a reference to the latter patents that the color formers thereof have been modified by the inclusion of radicals of resins, of polypeptides, of hydrogenated ring systems, of carbohydrates, and of long alkyl chains, and by having the radical of the color formers recur a number of times in the final molecule. It is to be understood that the color formers of the present invention may include substantive groups or molecular enlarging groups (in addition to those previously mentioned) for the purpose of rendering the same fast to diffusion.

The compounds of the invention may be prepared by condensing while heating in an inert solvent, e. g., benzene, xylene or dioxane, one mol of a guanazol of the formula

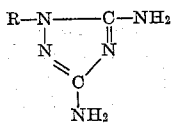

with one or two mols of a beta keto acid ester of the formula $$R_2COCH_2COOR_3$$

wherein R and $R_2$ are as defined above and $R_3$ is a simple alkyl group, e. g., methyl or ethyl. A well-known example of the beta keto esters is acetoacetic ester.

The invention is illustrated by the following examples, to which, however, it is not to be limited. Parts are by weight.

*Example 1.—3.5-di (acetylaceto)-1-phenyl guanazol*

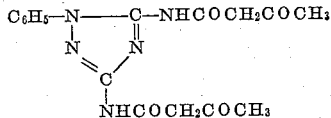

Three parts of phenyl guanazol was dissolved in 35 parts of dry xylene and to this was added 5.35 parts (2.4 mol equiv.) of acetoacetic ester. The mixture was refluxed for 15 minutes. Approximately 10 parts of a mixture of the solvent and alcohol formed was distilled off and the yellow liquid residue decanted and allowed to cool. The precipitated product was filtered off and recrystallized from ethanol. The product has a melting point of 195° C. It gave an excellent yellow dye with the oxidation product of a p-diethyl-amino aniline developer.

*Example 2.—3.5-di (benzoylaceto)-1-phenyl guanazol*

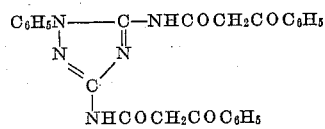

Three parts of phenyl guanazol was dissolved in 35 parts of dry xylene and to this was added 7.9 parts (2.4 mol equiv.) of ethyl benzoyl acetate. The mixture was refluxed for 20 minutes. Approximately 10 parts of a mixture of the solvent and formed ethanol was distilled off and the residue allowed to cool. The white precipitate was filtered off and washed several times with ethanol. The product has a melting point of 218°–220° C. This product also gave an excellent yellow dye with the oxidation product of a p-diethyl-aminoaniline developer.

I claim:

1. An acylacetamino-1,2,4-triazole of the general formula:

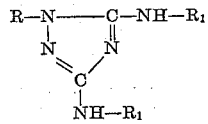

wherein R is selected from the group consisting of aralkyl and aryl radicals, $R_1$ is selected from the group consisting of H and the acylaceto group —$COCH_2COR_2$ wherein $R_2$ is selected from the group consisting of alkyl, cycloalkyl, aralkyl and aryl radicals, $R_1$ being at least once the aforesaid acylaceto group, said compounds being free from phenolic hydroxyl groups.

2. A 3,5-diacylacetamino-1,2,4-triazole of the general formula:

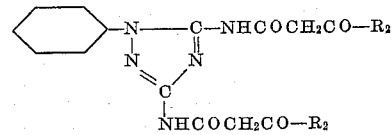

wherein $R_2$ is selected from the group consisting of alkyl, cycloalkyl, aralkyl and aryl radicals, said compound being free from phenolic hydroxyl groups.

3. 1-phenyl-3.5-di(acetylacetamino)-1.2.4- triazole.

4. 1-phenyl - 3.5 - di(benzoylacetamino) - 1.2.4-triazole.

5. 1-phenyl - 3.5 - di(p - stearoylaminobenzoylacetamino)-1.2.4-triazole.

ABRAHAM BAVLEY.